United States Patent
Kulewski et al.

(10) Patent No.: US 9,519,957 B1
(45) Date of Patent: Dec. 13, 2016

(54) AUTOMATED SELECTIVE APPLICATION OF FILL LIGHT FILTER

(71) Applicant: Google Inc., Mountain View, CA (US)

(72) Inventors: Krzysztof Kulewski, Sunnyvale, CA (US); Aravind Krishnaswamy, San Jose, CA (US); Sevket Derin Babacan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 14/323,911

(22) Filed: Jul. 3, 2014

(51) Int. Cl.
*G06K 9/40* (2006.01)
*G06T 5/00* (2006.01)

(52) U.S. Cl.
CPC ..... *G06T 5/008* (2013.01); *G06T 2207/20172* (2013.01)

(58) Field of Classification Search
None
See application file for complete search history.

(56) References Cited

U.S. PATENT DOCUMENTS

| | | | |
|---|---|---|---|
| 5,130,786 A * | 7/1992 | Murata | H04N 11/042 375/240.25 |
| 6,580,835 B1 | 6/2003 | Gallagher et al. | |
| 7,071,948 B2 * | 7/2006 | Wilensky | G06T 5/003 345/581 |
| 7,177,469 B2 | 2/2007 | Kagawa et al. | |
| 8,000,551 B2 | 8/2011 | Arici et al. | |
| 8,411,991 B2 | 4/2013 | Jo et al. | |
| 2008/0112639 A1 | 5/2008 | Min et al. | |
| 2008/0112641 A1 * | 5/2008 | Oakley | H04N 5/361 382/274 |
| 2012/0306904 A1 * | 12/2012 | Francois | G06T 7/0081 345/589 |

FOREIGN PATENT DOCUMENTS

| | | |
|---|---|---|
| JP | 2010021792 A | 1/2010 |
| JP | 2012039440 A | 2/2012 |

* cited by examiner

*Primary Examiner* — Eueng-Nan Yeh
(74) *Attorney, Agent, or Firm* — McDermott Will & Emery LLP

(57) ABSTRACT

Aspects of the subject technology relate to automatically and selectively applying a fill light filter to an image. A process includes determining an edge-preserved, smoothed version of the image, and determining a grayscale version of the image. The process also includes comparing each pixel of the edge-preserved, smoothed version of the image to each corresponding pixel of the grayscale version of the image. The process also includes applying the fill light filter to the image based on the comparison. The fill light filter is automatically adjusted based on identifying regions in the image. Selectively applying the fill light filter can reduce artifacts and noise from forming or being amplified as a result of the fill light filter.

20 Claims, 6 Drawing Sheets

US 9,519,957 B1

AUTOMATED SELECTIVE APPLICATION OF FILL LIGHT FILTER

BACKGROUND

The present disclosure relates generally to image processing and more particularly to methods and systems for automatically, selectively applying a fill light filter to an image.

Digital photo quality can be improved through software post processing. For instance, a fill light filter or enhancement brightens shadows and other dark areas in an image. However, taking photos with image sensors of low or insufficient sensitivity, or lossy compression applied by photo devices can produce problematic areas such as dark, noisy, non-smooth areas and artifacts of various sizes in an image. Applying a fill light filter to such an image amplifies the problematic areas, which effectively degrades photo quality. Therefore, the availability of a fill light filter or the strength of the fill light filter applied is limited.

SUMMARY

Aspects of the subject technology relate to automatically, selectively applying a fill light filter to an image, including a method for image processing. The method includes determining an edge-preserved, smoothed version of an image, determining a grayscale version of the image, comparing each pixel of the edge-preserved, smoothed version of the image to each corresponding pixel of the grayscale version of the image, and applying a fill light filter to the image based on the comparison Aspects of the subject technology also relate to a non-transitory machine-readable medium including instructions stored therein, which when executed by a machine, cause the machine to perform operations. The operations include determining an edge-preserved, smoothed version of an image, determining a grayscale version of the image, comparing each pixel of the edge-preserved, smoothed version of the image to each corresponding pixel of the grayscale version of the image, and applying a fill light filter to the image based on the comparison.

Aspects of the subject technology also relate to a method for image processing. The method includes determining a first modified version of each pixel of an image, determining a second modified version of each pixel of the image, analyzing each pixel of the image by comparing at least the first modified version of each pixel to the second modified version of each pixel, respectively, determining a magnitude adjustment value for each pixel based on the comparison, and applying an image filter to each pixel based on the respective magnitude adjustment value for each pixel.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In accordance with one or more implementations, methods and systems for automatically and selectively applying a fill light filter to an image are disclosed. The image is analyzed to determine regions where applying a full fill light filter would undesirably create or amplify noise or artifacts. For example, applying the full fill light filter to a dark region may create artifacts. Reducing the fill light filter or not applying the fill light filter to such a dark region may reduce the artifact formed.

Figure 1A:
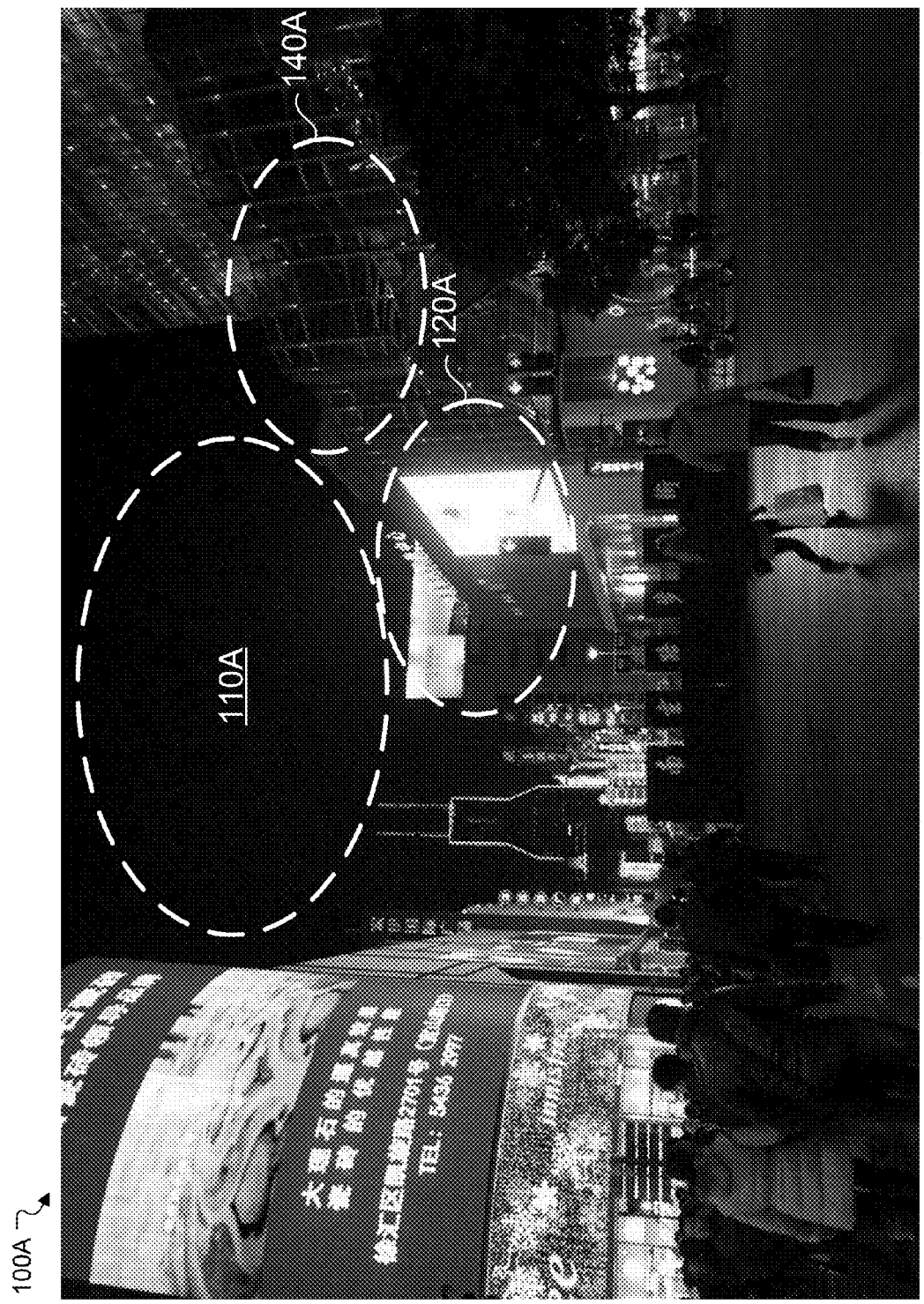
FIG. 1A is a photograph illustrating a night-time image according to example aspects of the present disclosure.

According to certain aspects, an image is represented in a RGB (red, green, blue) format. FIG. 1A depicts an input image 100A. The input image 100A includes a dark area 110A, a light area 120A, and a shadow area 140A. The dark area 110A may be, for example, a dark sky which would desirably remain dark after any post processing. Applying a classical fill light filter or a full fill light filter to all areas of the input image 100A brightens the entire image, resulting in undesirably lightening or brightening the dark area 110, and amplifying or highlighting any artifacts. The light area 120A may be, for example, a bright area such as a light source. The light area 120A would desirably remain bright after any post processing, without affecting nearby areas. The shadow area 140A may correspond to a dark area which would desirably be brightened after post processing.

Figure 1B:
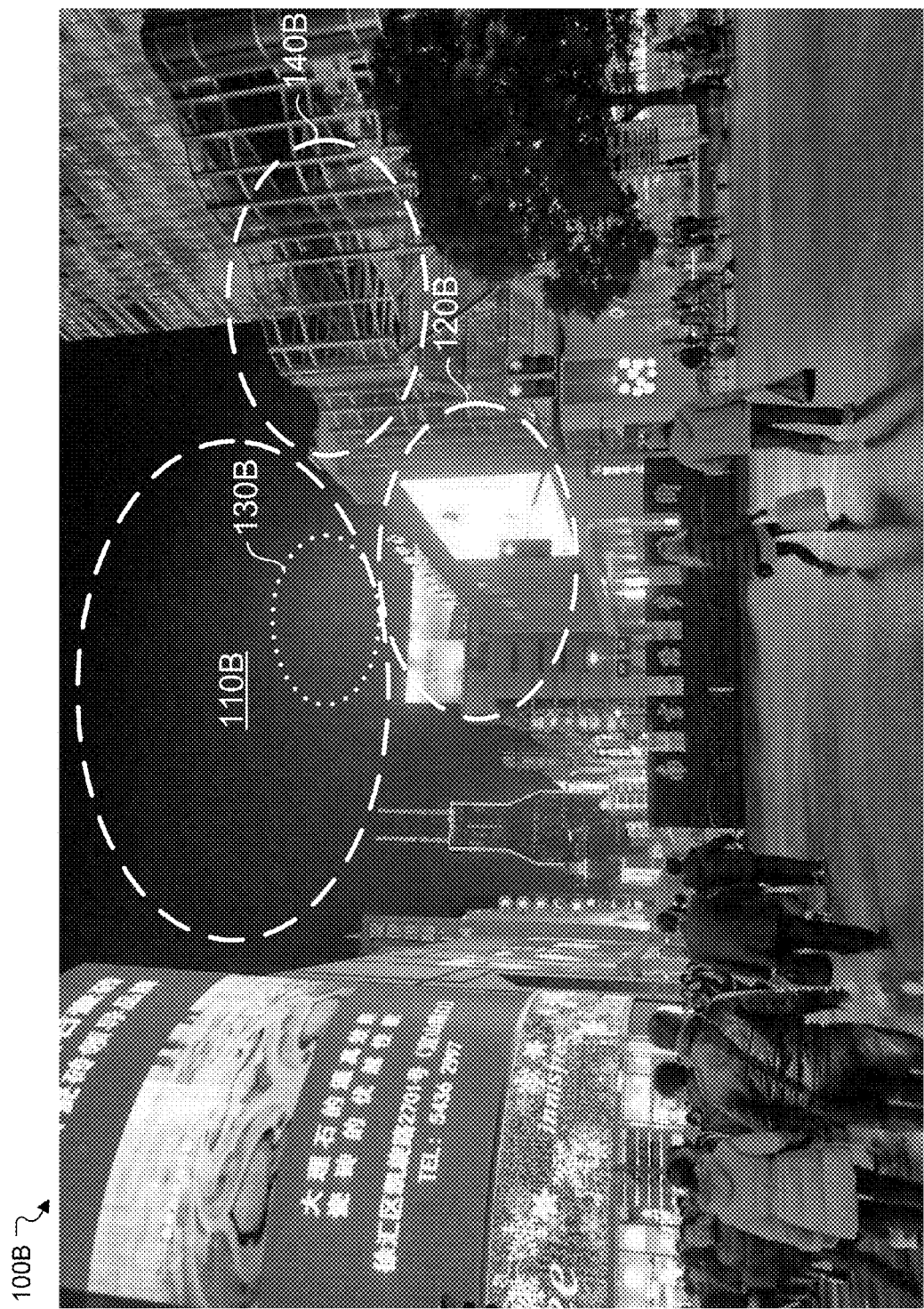
FIG. 1B is a photograph illustrating a fill light filter applied to the image of FIG. 1A according to example aspects of the present disclosure.

FIG. 1B shows a fill light filter output image 100B having the full fill light filter applied equally to all areas of the input image 100A. The output image 100B includes a dark area 110B, corresponding to the dark area 110A, a light area 120B, corresponding to the light area 120A, and a shadow area 140B, corresponding to the shadow area 140A. As seen in FIG. 1B, all areas of the output image 100B are brighter compared to the input image 100A. For instance, the shadow area 140B is brighter than the shadow area 140A, and shows more contrast between the lighter beams of the building and the darker interior portions. Specifically, smaller beams in the background of the shadow area 140B are more visible than in the shadow area 140A. However, the dark area 110B is undesirably brightened compared to the dark area 110A. In particular, an artifact 130B, which is adjacent the light area 120B, noticeably brightens the dark area 110B compared to the dark area 110A. A portion of the dark area 110B away from the light area 120B is not as bright as the artifact 130B, which suggests that the fill light filter has undesirably brightened all dark areas which are adjacent to bright areas. The artifact 130B appears as a blur or gradient extending from the light area 120B, whereas in the dare area 110A, there are no such blurs or gradients. To prevent these artifacts from forming or to reduce the amplification of noise, a user may manually select regions to apply or not apply the fill light filter, or to reduce the fill light filter in selected regions. However, the user may not wish to manually select regions.

Aspects of the present disclosure describe a process for automatically adjusting the fill light filter. The automatic adjustment of fill light application begins with determining two modified versions of the input image 100A. An edge-preserved, smoothed version of the input image 100A is generated. The edge-preserved, smoothed version blurs non-edge portions of the input image 100A, while preserving or leaving unmodified the edge portions of the input image 100A. An edge-preserving, smoothing function, such as a Local Statistical Convolution (LSC) function, may be used for generating the edge-preserved, smoothed version. The edge-preserved, smoothed version is also converted to grayscale, although in certain implementations the LSC function incorporates grayscaling. A luminance of the input image 100A is also determined. The luminance formula may be modified to produce a grayscale version of the input image 100A.

The edge-preserved, smoothed version of the input image 100A is compared to the grayscale version of the input image 100A. The comparison includes calculating a difference between the color values of the edge-preserved, smoothed version and the grayscale version for each pixel. The difference is negative for noisy areas of the input image 100A, indicating that reduced or no fill light filter should be applied to that pixel.

The comparison may be calculated through a series of functions. For the input image 100A in the RGB format, the color channel values may be represented as R(x, y), G(x, y), and B(x, y), where (x, y) are pixel coordinates. Rather than generating new images for the two modified versions, the edge-preserved, smoothed version may be represented as a function LSC(x, y), wherein the LSC function preserves edges and blurs non-edges. The grayscale version may be represented by Equation 1.

$$\text{Lum}(x,y)=r*R(x,y)+g*G(x,y)+b*B(x,y) \quad \text{Equation 1}$$

The coefficients r, g, and b are values selected to produce a grayscale version. For example, r=0.299, g=0.587, and b=0.114.

A linear combination of LSC and Lum may be represented by Equation 2.

$$f(x,y)=\alpha*\text{Lum}(x,y)+\beta*\text{LSC}(x,y) \quad \text{Equation 2}$$

More specifically, the linear combination may be represented by Equation 3.

$$f(x,y)=\text{Lum}(x,y)+n*(\text{LSC}(x,y)-\text{Lum}(x,y)) \quad \text{Equation 3}$$

In Equation 3, n is selected to produce high values for brighter pixels, low values for darker pixels, and lower values than the high values for lighter pixels surrounded by darker pixels, which corresponds to LSC(x, y) being significantly smaller than Lum(x, y).

The values from f(x, y) may be translated smoothly to values between 0.0 and 1.0 by constructing a sigmoid function represented by Equation 4.

$$S(x,y)=1/(1+e^{-(\gamma*f(x,y)-\delta)}) \quad \text{Equation 4}$$

In Equation 4, γ and δ are selected to produce values closer to 0.0 where less fill light should be applied to achieve better enhanced photo quality, and produce values closer to 1.0 where more fill light should be applied because the region is not very dark or more fill light may be otherwise applied without quality loss. In other words, f(x, y) values above a bright threshold will produce S(x, y) values closer to 1.0, and f(x, y) values below a dark threshold will produce S(x, y) values closer to 0.0.

The fill light filter may be selectively applied to the input image by calculating a magnitude adjustment value from the sigmoid function (Equation 4) to scale a classical fill light value. The output may be a function represented by Equation 5.

$$\text{output}(x,y)=\text{input}(x,y)+\text{classical\_fill\_light}(x,y)*S(x,y) \quad \text{Equation 5}$$

Because the S(x, y) values are between 0.0 and 1.0, this output function allows reduced fill light to be applied to pixels corresponding to dark areas or noisy areas.

Figure 1C:
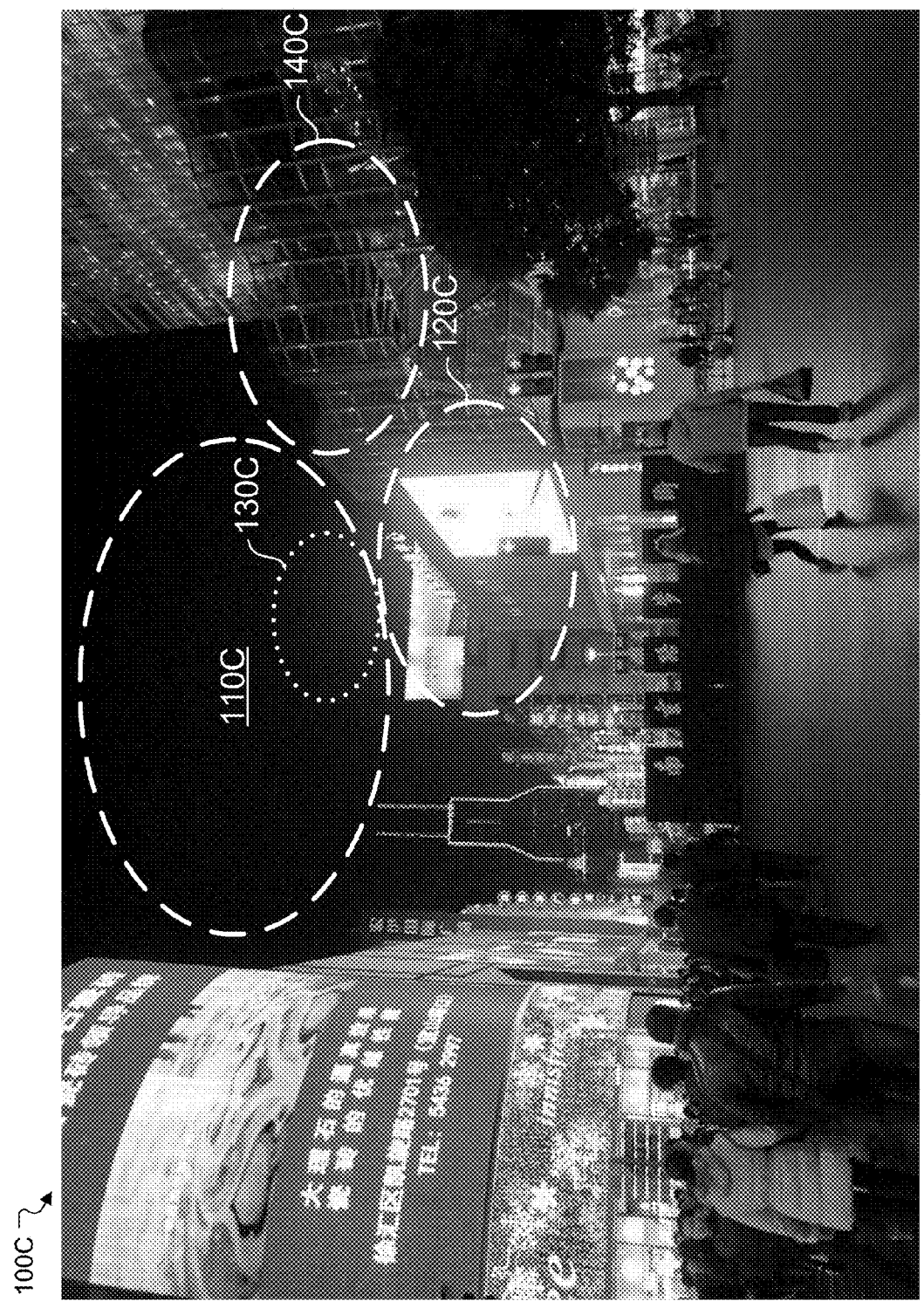
FIG. 1C is a photograph illustrating a fill light filter automatically and selectively applied to the image of FIG. 1A according to example aspects of the present disclosure.

FIG. 1C shows an adjusted fill light filter output image 100C, with the fill light filter selectively applied, such as through the output function described above. The output image 100C includes a dark area 110C, corresponding to the dark area 110A, a light area 120C, corresponding to the light area 120A, and a shadow area 140C, corresponding to the shadow area 140A. Compared to the output image 100B, the output image 100C is not as bright across the entire image, and is selectively brighter or darker in certain areas. The light area 120C is brighter than the light area 120A, as the fill light filter has been applied. As compared to the dark area 110B of the output image 100B, the dark area 110C is relatively dark, more similar to the dark area 110A. A region 130C is not significantly brighter than the dark area 110A of the input image 100A. In other words, a blur or gradient extending from the light area 120C is not exhibited. By analyzing the input image 100A, the dark area 110A is recognized as a region to apply a reduced fill light filter. Compared to the artifact 130B, the region 130C does not exhibit artifacts. Overall, the output image 100C is brighter than the input image 100A in light areas, and not as bright as the output image 100B in dark areas, to better preserve the dark areas. For instance, the shadow area 140C is brighter than the shadow area 140A, as seen by the background beams being visible and the interior portions remaining relatively dark compared to the shadow area 140B.

Although the input image 100A is described as RGB format, in other implementations the input image may user different color spaces or formats. The process described herein may utilize the different color spaces as inputs, or may convert the color space before further processing. The modified fill light filter may be selectively applied to specific regions, such as dark areas, and the unmodified fill light filter applied to other areas. In addition, the processes described herein may be applied to images such as photos, as well as frames of a video.

The edge-preserving, smoothing function may be another function, such as a Gaussian filter function in which a radius of a Gaussian kernel varies, or a bilateral filtering function, or other similar function. In addition, the parameters for the linear combination of functions may vary. Alternatively, a different type of combination, such as a higher degree function, may be used. The parameters of the functions, such as the sigmoid function, may vary as needed, or may be replaced by other similar functions. The functions may further be modified to account for other factors, such as image characteristics or detected image content interpretation. For example, the parameters may vary for images taken at night versus day, outdoors versus indoors, flash or without flash, and other characteristics including labels. Moreover, although the parameters and functions described herein are directed towards automatically adjusting a fill light filter, the parameters and functions may be modified to automatically adjust application of image filters or other post processing filters.

Figure 2:
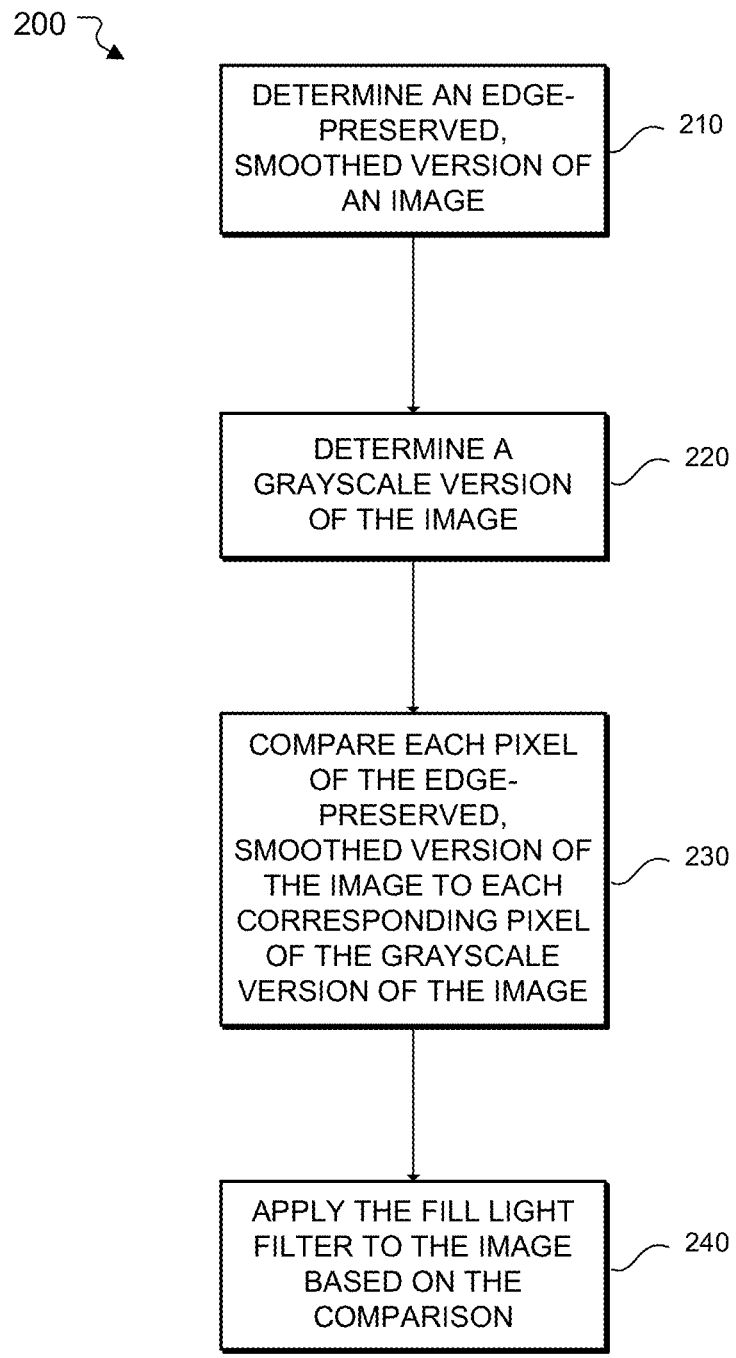
FIG. 2 is a flowchart illustrating a process for automatically and selectively applying a fill light filter according to example aspects of the present disclosure.

FIG. 2 depicts a flowchart 200 of a process for automatically adjusting a fill light filter according to certain aspects. At block 210, an edge-preserved, smoothed version of an image is determined. The edge-preserved, smoothed version of the image may be generated from an edge-preserving, smoothing function such as an LSC function, or may be a new modified image temporarily stored for analysis. At block 220, a grayscale version of the image is determined. The grayscale version of the image may be generated from an image filter function, such as a luminance function, or may be another modified image temporarily stored for analysis. Although blocks 210 and 220 describe determining modified versions of the image, the modified versions may not be new images generated, but rather color values for each pixel. In addition, blocks 210 and 220 may occur in any order, or concurrently.

At block 230, each pixel of the edge-preserved, smoothed version of the image is compared to each corresponding pixel of the grayscale version of the image. The comparison may occur concurrently with the determinations in blocks 210 and 220. For example, the LSC function and the luminance function may be linearly combined. The parameters of the linear combination may be selected for specific properties, such as producing high values for brighter pixels, low values for darker pixels, and lower values than the high values for lighter pixels surrounded by darker pixels.

At block 240, the fill light filter is applied to the image based on the comparison. For example, the linearly combined function from block 230 may be used to determine scaling values for scaling a magnitude of the fill light filter as applied to each pixel. A sigmoid function or other functions which produce output values along a curve may be used. The parameters of the sigmoid function may be selected to produce a curve having values closer to 0.0 where less fill light should be applied (e.g., dark areas and lighter areas surrounded by dark areas), and values closer to 1.0 where more fill light should be applied (e.g., lighter areas).

Figure 3:
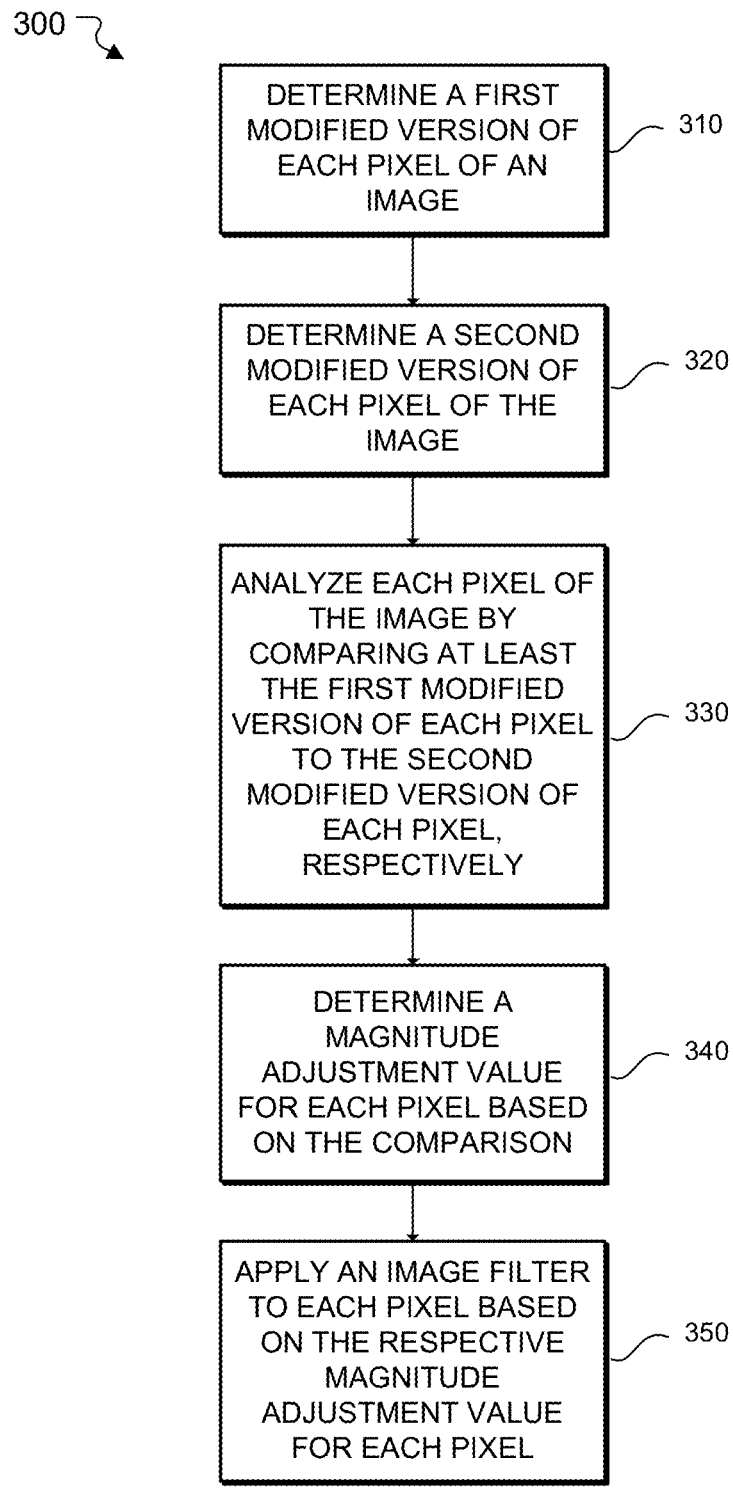
FIG. 3 is a flowchart illustrating a process for automatically and selectively applying an image filter to an image according to example aspects of the present disclosure.

FIG. 3 depicts a flowchart 300 of a process for automatically adjusting an image filter according to certain aspects. At block 310 a first modified version of each pixel of an image is determined. For example, an LSC function LSC(x, y) may be applied to each pixel of the image. At block 320, a second modified version of each pixel of the image is determined. For instance, a luminance function may be applied, for an image in an RGB format, shown by Equation 6.

$$Lum(x,y)=0.299*R(x,y)+0.587*G(x,y)+0.114*B(x,y) \quad \text{Equation 6}$$

The coefficients of Lum(x, y) are selected to produce a grayscale value, but may vary in other implementations. For example, the coefficients may be changed to emphasize or bias for specific color ranges.

At block 330, each pixel of the image is analyzed by comparing at least the first modified version of each pixel to the second modified version of each pixel, respectively. For instance, a linear combination may be used, shown by Equation 7.

$$f(x,y)=Lum(x,y)+1.822*(LSC(x,y)-Lum(x,y)) \quad \text{Equation 7}$$

The coefficients of f(x, y) are selected such that f(x, y) produces high values for brighter pixels, lower values for very dark pixels, and lower values for lighter pixels surrounded by darker pixels. In other implementations the coefficients may vary to achieve other effects. For example, the coefficients may be changed to produce lower values for dark pixels surrounded by lighter pixels.

At block 340, a magnitude adjustment value for each pixel is determined based on the comparison. The magnitude adjustment value corresponds to a scaling value to adjust the magnitude of the image filter, such as a fill light filter. Other image filters include blurring, sharpening, color alterations, etc. For instance, a sigmoid function may be used, such as Equation 8.

$$S(x,y)=1/(1+e^{-(0.125*f(x,y)-4)}) \quad \text{Equation 8}$$

The coefficients of S(x, y) are selected to smoothly translate the Lum and LSC relation to values between 0.0 and 1.0 such that S(x, y) produces values closer to 0.0 where less fill light should be applied, and closer to 1.0 where more fill light should be applied. In other implementations, the coefficients may vary to achieve other effects. For example, the scale may be biased from 0.0 to 0.5. The coefficients may also be based on characteristics of the image. For instance, indoor images may utilize one set of coefficients, and outdoor images may utilize a second set of coefficients. Alternatively, the magnitude adjustment value may be 1.0 (e.g., no adjustment to the image filter) for certain regions, which may be determined by the comparison at block 330.

At block 350, the image filter is applied to each pixel based on the respective magnitude adjustment value for each pixel. The output image may be calculated as a function of pixel coordinates based on an input image. Applying the sigmoid function above to a classical fill light, the output image may be calculated by Equation 9.

$$output(x,y)=input(x,y)+classical\_fill\_light(x,y)*S(x,y) \quad \text{Equation 9}$$

Although the flowchart 300 organizes the calculations into separate blocks, in certain implementations, the calculations may be a combination of functions, such as the output(x, y) function. A computer may calculate the output of the function without strictly adhering to the structure shown in FIG. 3.

Figure 4:
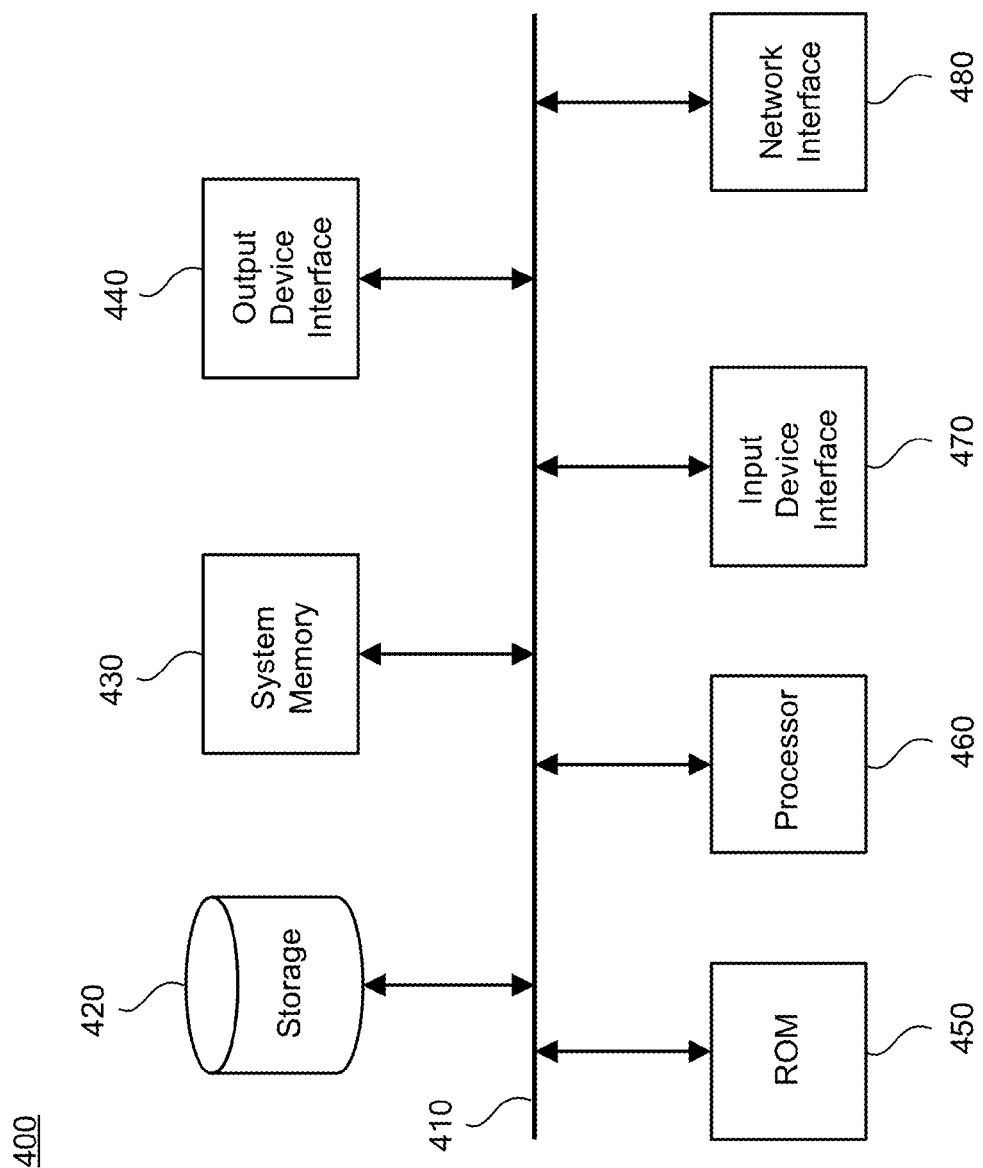
FIG. 4 shows a diagram of an electronic system according to example aspects of the present disclosure.

FIG. 4 conceptually illustrates an example electronic system with which some implementations of the subject technology can be implemented. Electronic system 400 can be a computer, phone, PDA, or any other sort of electronic device such as a digital camera. Such an electronic system includes various types of computer readable media and interfaces for various other types of computer readable media. Electronic system 400 includes a bus 410, processing unit(s) 460, a system memory 430, a read-only memory (ROM) 450, a permanent storage device 420, an input device interface 470, an output device interface 440, and a network interface 480.

Bus 410 collectively represents all system, peripheral, and chipset buses that communicatively connect the numerous internal devices of electronic system 400. For instance, bus 410 communicatively connects processing unit(s) 460 with ROM 450, system memory 430, and permanent storage device 420.

From these various memory units, processing unit(s) 460 retrieves instructions to execute and data to process in order to execute the processes of the subject disclosure. The processing unit(s) can be a single processor or a multi-core processor in different implementations.

ROM 450 stores static data and instructions that are needed by processing unit(s) 460 and other modules of the electronic system. Permanent storage device 420, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 420.

Other implementations use a removable storage device (for example, a floppy disk, flash drive, and its corresponding disk drive) as permanent storage device 420. Like permanent storage device 420, system memory 430 is a read-and-write memory device. However, unlike storage device 420, system memory 430 is a volatile read-and-write memory, such as a random access memory. System memory 430 stores some of the instructions and data that the processor needs at runtime. In some implementations, the processes of the subject disclosure are stored in system memory 430, permanent storage device 420, or ROM 450. For example, the various memory units include instructions for automatically and selectively applying a fill light filter. From these various memory units, processing unit(s) 460 retrieves instructions to execute and data to process in order to execute the processes of some implementations.

Bus 410 also connects to input and output device interfaces 470 and 440. Input device interface 470 enables the user to communicate information and select commands to the electronic system. Input devices used with input device interface 470 include, for example, alphanumeric keyboards and pointing devices (also called "cursor control devices"). Output device interfaces 440 enables, for example, the display of images generated by the electronic system 400. Output devices used with output device interface 440 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 410 also couples electronic system 400 to a network (not shown) through a network interface 480. In this manner, the computer can be a part of a network of computers (for example, a local area network (LAN), a wide area network (WAN), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method for image processing, the method comprising:
   determining an edge-preserved, smoothed version of an image;
   determining a grayscale version of the image;
   comparing each pixel of the edge-preserved, smoothed version of the image to each corresponding pixel of the grayscale version of the image to determine a comparison value for each pixel;
   determining a scaling value for each pixel based on the respective comparison value; and
   selectively applying a fill light filter to the image by scaling the applied fill light filter for each pixel based on the respective scaling value.

2. The method of claim 1, wherein determining the edge-preserved, smoothed version of the image comprises:
   blurring non-edge areas of the image; and
   determining a grayscale version of the at least partially blurred image.

3. The method of claim 1, wherein comparing each pixel of the edge-preserved, smoothed version of the image to each corresponding pixel of the grayscale version of the image comprises determining a difference between color values of each pixel of the edge-preserved, smoothed version of the image and color values of each corresponding pixel of the grayscale version of the image.

4. The method of claim 3, wherein applying the fill light filter comprises reducing the applied fill light filter to a pixel when the determined difference for the pixel is negative.

5. The method of claim 1, wherein determining the edge-preserved, smoothed version of the image comprises applying a Local Statistical Convolution (LSC) function to each pixel of the image.

6. The method of claim 1, wherein determining the grayscale version of the image comprises applying a luminance function to each pixel of the image.

7. The method of claim 1, wherein comparing each pixel of the edge-preserved, smoothed version of the image to each corresponding pixel of the grayscale version of the image comprises determining one or more characteristics of the image.

8. The method of claim 1, wherein comparing each pixel of the edge-preserved, smoothed version of the image to each corresponding pixel of the grayscale version of the image comprises calculating a linear combination of the edge-preserved, smoothed version of the image and the grayscale version of the image.

9. A non-transitory machine-readable medium including instructions stored therein, which when executed by a machine, cause the machine to perform operations comprising:
   determining an edge-preserved, smoothed version of an image;
   determining a grayscale version of the image;
   comparing each pixel of the edge-preserved, smoothed version of the image to each corresponding pixel of the grayscale version of the image to determine a comparison value for each pixel;
   determining a scaling value for each pixel based on the respective comparison value; and
   selectively applying a fill light filter to the image by scaling the applied fill light filter for each pixel based on the respective scaling value.

10. The non-transitory machine-readable medium of claim 9, wherein the operation of determining the edge-preserved, smoothed version of the image comprises operations for:
   blurring non-edge areas of the image; and
   determining a grayscale version of the at least partially blurred image.

11. The non-transitory machine-readable medium of claim 9, wherein the operation of comparing each pixel of the edge-preserved, smoothed version of the image to each corresponding pixel of the grayscale version of the image comprises operations for determining a difference between color values of each pixel of the edge-preserved, smoothed version of the image and color values of each corresponding pixel of the grayscale version of the image.

12. The non-transitory machine-readable medium of claim 11, wherein the operation for applying the fill light filter comprises operations for reducing the applied fill light filter to a pixel when the determined difference for the pixel is negative.

13. The non-transitory machine-readable medium of claim 9, wherein the operation for determining the edge-preserved, smoothed version of the image comprises operations for applying a Local Statistical Convolution (LSC) function to each pixel of the image.

14. The non-transitory machine-readable medium of claim 9, wherein the operation for determining the grayscale version of the image comprises operations for applying a luminance function to each pixel of the image.

15. The non-transitory machine-readable medium of claim 9, wherein the operation for comparing each pixel of the edge-preserved, smoothed version of the image to each corresponding pixel of the grayscale version of the image comprises operations for determining one or more characteristics of the image.

16. The non-transitory machine-readable medium of claim 9, wherein the operation for comparing each pixel of the edge-preserved, smoothed version of the image to each corresponding pixel of the grayscale version of the image comprises operations for calculating a linear combination of the edge-preserved, smoothed version of the image and the grayscale version of the image.

17. A system comprising:
   one or more processors; and
   a non-transitory computer-readable medium comprising instructions stored therein, which, when executed by the one or more processors, cause the one or more processors to perform operation comprising:
      determining a first modified version of each pixel of an image;
      determining a second modified version of each pixel of the image;
      determining a comparison value for each pixel of the image by comparing at least the first modified version of each pixel to the second modified version of each pixel, respectively;
      determining a magnitude adjustment value for each pixel based on the respective comparison value; and
      selectively applying an image filter to each pixel based on the respective magnitude adjustment value for each pixel.

18. The system of claim 17, wherein determining the first modified version of each pixel of the image cause the one or more processors to perform operations comprising applying a first image filter function to each pixel of the image, and wherein determining the second modified version of each pixel of the image comprises applying a second image filter function to each pixel of the image.

19. The system of claim 18, wherein determining a comparison value for each pixel of the image cause the one or more processors to perform operations comprising calculating a linear combination of the first image filter function and the second image filter function for each pixel of the image.

20. The system of claim 19, wherein determining the magnitude adjustment value for each pixel cause the one or more processors to perform operations comprising calculating a sigmoid function based on the linear combination.

* * * * *